Patented June 15, 1943

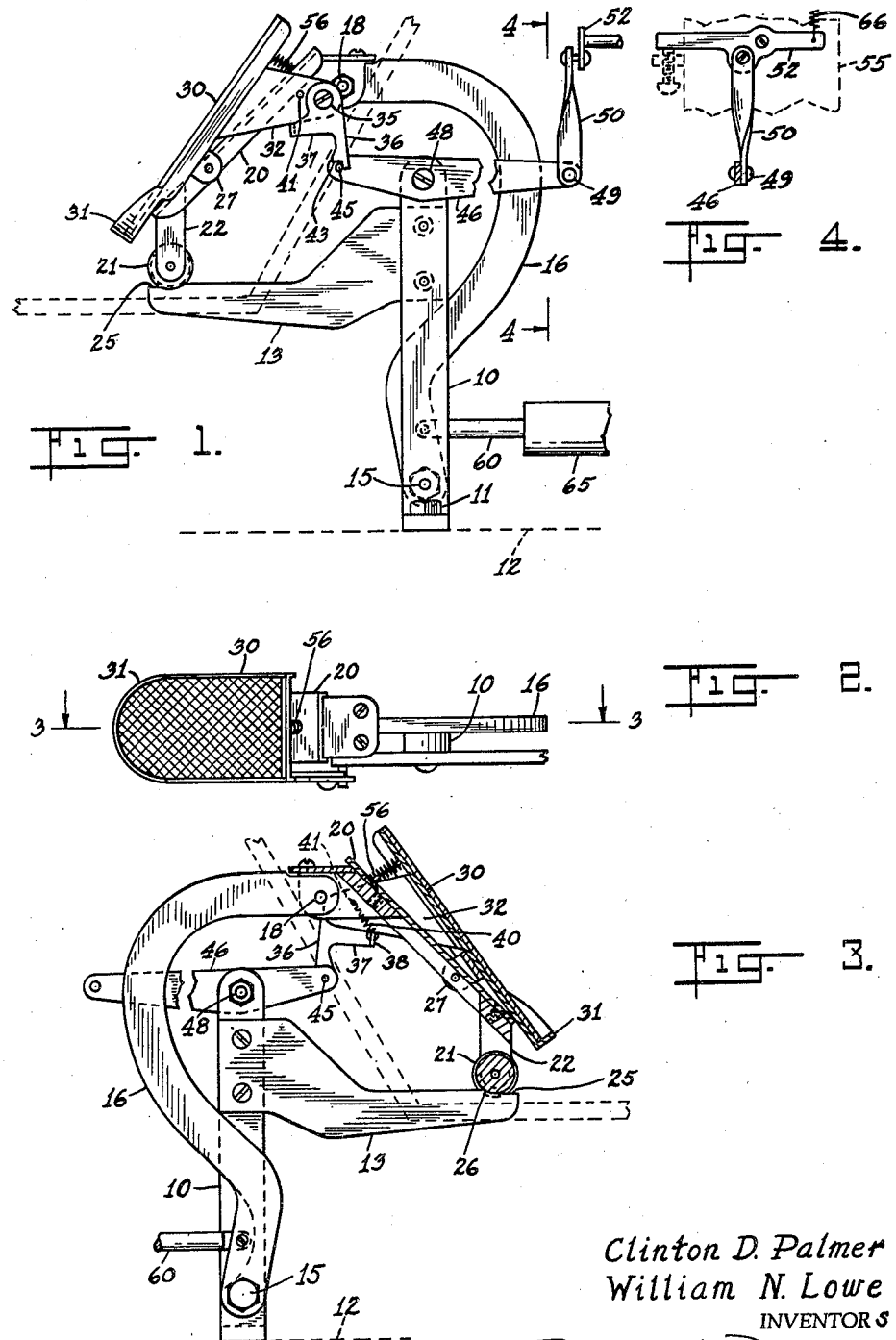

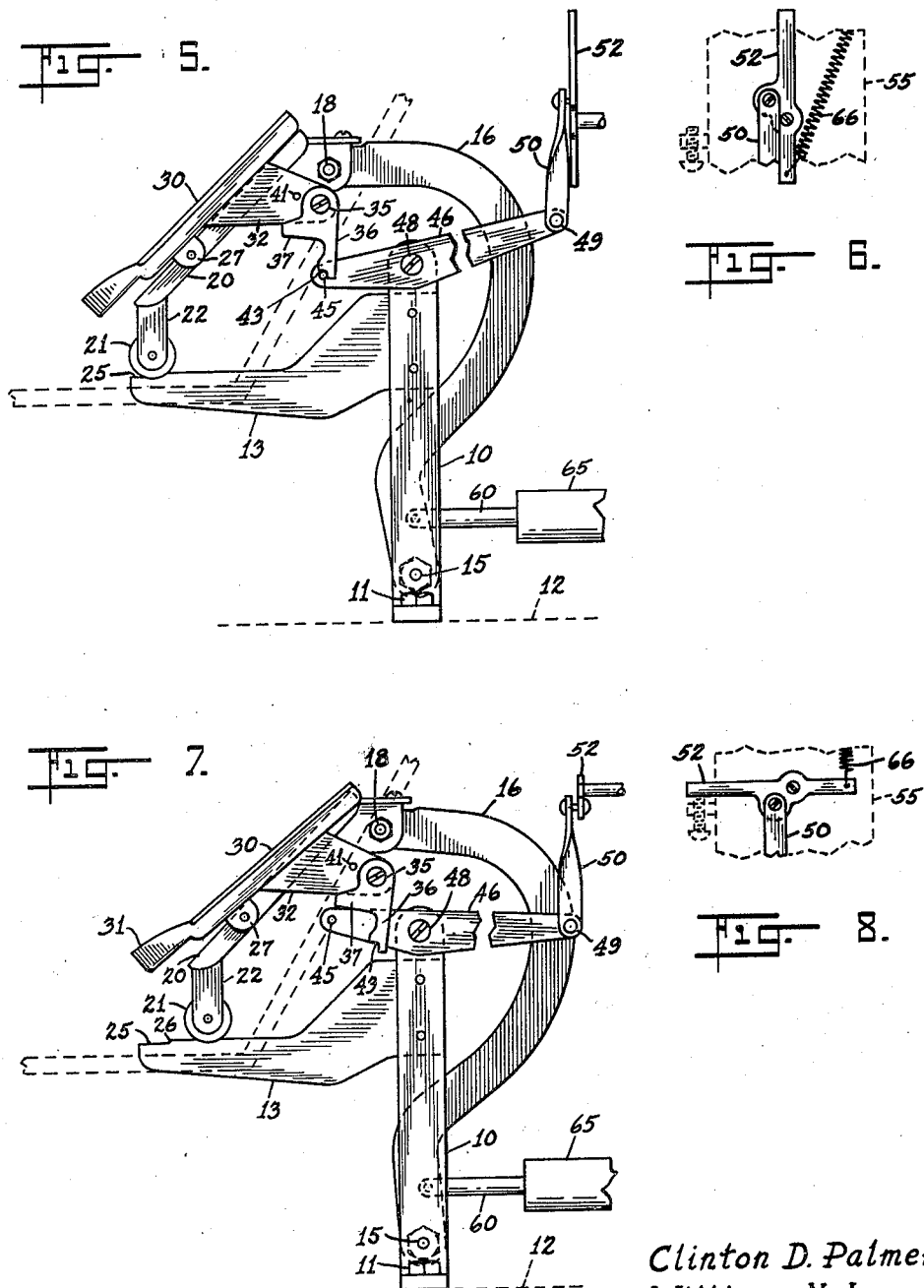

2,321,614

UNITED STATES PATENT OFFICE 2,321,614

VEHICLE CONTROL MECHANISM

Clinton D. Palmer and William N. Lowe, River Forest, Ill.

Application April 20, 1940, Serial No. 330,742

5 Claims. (Cl. 192—3)

Our invention relates to mechanisms for the control of power operated vehicles such as automobiles, etc., and has to do more particularly with an improved mechanism for controlling the propulsion and braking of such vehicles.

As is well known, standard automobiles are provided in the floor thereof, in front of the driver's position, with a foot-operable element for maintaining and accelerating the speed of the vehicle, while adjacent said element is provided an independent foot-operable element for actuating the brake. The brake control element is disposed for operation by the same foot of the operator as controls the accelerator and, hence, it is necessary, whenever the operator is required suddenly to reduce the speed of the vehicle or to stop it, to shift his foot from the accelerator to the brake pedal. It has been found from a large number of tests upon drivers of all temperaments that, while the time required for such a shift of the operator's foot varies, according to the speed of reaction of the individual, in any case a substantial amount of time is required, varying in the average, with experienced drivers, from a half second to 1.7 seconds. Such a lapse of time, while seemingly small, is sufficient in many cases to cause serious accident, especially when the vehicle is moving at high speed, in view of the fact that, at 60 miles an hour, a vehicle travels 88 feet per second.

A particular object of our invention is to provide a device which will entirely eliminate the lapse of time required for the shift of the operator's foot from accelerating to braking position required in standard automobiles of the present type. According to our invention, we provide a combination device for controlling acceleration and braking, said device having a single foot pedal. Hence, according to our invention, the lapse of time required for a change in the control of the car from acceleration to braking, is limited solely by the speed of mental and muscular reaction of the individual.

Another object of our invention is to provide a device of the type referred to, wherein acceleration is controlled by a pivotal movement of the operator's foot about the ankle or a gentle forward movement in a manner substantially similar to the mode of control of present standard accelerators, while braking is affected by a more substantial forward movement of the foot, which is also substantially similar to the present mode of control of standard automobile brakes. Hence, in order to operate a device embodying our invention, it is unnecessary for an operator to learn any new muscular movements, but he may react muscularly in substantially the same manner as with standard automobile controls, except that the objectionable lateral foot shift is entirely eliminated.

Still another object is to provide a device of the type referred to wherein, at the instant braking action is initiated, feeding of power is automatically completely withdrawn.

A further object of our invention is to provide a device of the type referred to which will be simple in construction, efficient in operation, inexpensive to manufacture and, in general, thoroughly satisfactory for the purposes desired.

Various other objects and advantages may suggest themselves as the description proceeds.

Referring now to the drawings forming a part of this specification and illustrating a preferred embodiment of our invention:

Fig. 1 is a side elevational view of a device embodying our invention with the parts in inactive position;

Fig. 2 is a top plan view of the same;

Fig. 3 is a sectional view taken substantially along the line 3—3 of Fig. 2;

Fig. 4 is a view taken substantially along the line 4—4 of Fig. 1;

Figs. 5 and 6 are views similar, respectively, to Figs. 1 and 4, with the parts in power feeding position; and Figs. 7 and 8 are similar views with the parts in braking position.

Our improved control device comprises an L-shaped bracket 10 which may be secured, as by screws or rivets 11, to any convenient part 12 of the vehicle body or operating elements thereof. Rigidly secured to said bracket 10 is an arm 13, while pivotally connected to the bracket 10 as at 15 is an arm 16. Carried at the upper extremity of the arm 16 and pivoted thereof as at 18 is a sloping platform 20 having fixed thereto a pair of trunnions 22 journaling a roller 21, said roller normally resting on the upper surface of arm 13. It will be noted from Fig. 3 that the extremity of the arm 13 is depressed as at 25 so as to provide a shoulder 26 therein, the roller 21 normally resting on said depressed portion and being retained against undesired forward movement by said shoulder. Other means, such as a spring, may be used for resisting such movement.

Pivoted to the platform 20, as by means of ears 27, is a rockable platform 30 which may, if desired, be provided with a heel-retaining flange 31. An arm 32 secured to the rockable platform 30 has pivoted thereto as at 35 a link 36, said link having an ear 37 extending therefrom with an abutment 38 thereon which is perforated to retain one end of a coil spring 40, the other end of said spring being secured by a stud 41, or the like. The purpose of this spring 40, which is in tension, is to maintain the link 36 in the position shown in Fig. 1. It will be noted that this link is provided with an arcuate seat or recess 43 which engages an abutment or pin 45 which extends from a lever 46 which is pivoted to the bracket 10 as at 48. The opposite end of the lever 46 has pivoted thereto as at 49 a link 50, said link 50 being pivotally connected at its other end to a lever or crank 52 which controls a suitable valve (not shown) disposed in a fuel intake conduit 55, which may be the usual butterfly valve of a carbureter.

A compression spring 56 normally urges the rockable pedal or foot support 30 toward the position shown in Fig. 1.

Pivotally secured to the arm 16 is a piston rod 60 operatively connected to a piston (not shown) which reacts in a cylinder 65 to actuate a fluid-controlled braking system in the usual manner. It will be readily understood, of course, that in lieu of a so-called hydraulic braking system, the lever 60 may be connected to a mechanical braking system in a manner which need not be explained.

The operation of the device just described is substantially as follows. The foot of the operator normally rests on the rockable pedal 30 in any comfortable position, a preferred manner being with the heel resting on the flange 31. By pivotal movement of the pedal 30 about its pivot 27, motion is transmitted through the link 37 and lever 46 to the fuel intake valve, thus controlling the speed and acceleration of the vehicle, the parts taking the position shown in Figs. 5 and 6 or an intermediate position. When it is desired, however, quickly to reduce the movement of the vehicle, the operator thrusts his foot forward in the manner usually employed in actuating a foot brake, whereupon the arm 16 is moved about its pivot 15, the roller 21 being pushed over the shoulder 26, thus actuating the braking system through the piston rod 60, the link 36 being immediately disengaged, upon the initiation of said movement, from the pin 45, thus promptly withdrawing any further feeding of fuel. To this effect a tension spring 66 is provided on the lever 52 which normally closes the fuel intake valve when no force is applied to the lever 52 through the mechanism above described. The parts in braking take the position shown in Figs. 7 and 8, although, obviously, the platform 30 may, in Fig. 7, be oppositely rocked in braking position about its pivot 27, as seen in Fig. 1, without affecting the operation of the mechanism.

It will be understood, of course, that when the operator withdraws braking pressure from the mechanism, the parts will be restored to the position shown in Fig. 1 by reason of the hydraulic pressure within the braking system or other means which may be provided, such as springs (not shown), should a mechanical braking system be employed.

It will thus be seen that we have provided in a simple and compact mechanism means for actuating accelerating and braking mechanism by the same foot of an operator without shifting thereof and by employing the same or similar muscular movements as are used in present standard automotive mechanisms.

Various modifications may suggest themselves to those skilled in the art without departing from the spirit of our invention and, hence, we do not wish to be restricted to the specific form shown or uses mentioned, except to the extent indicated in the appended claims, which are to be interpreted as broadly as the state of the art will permit.

We claim:

1. In combination with a moving device having means for feeding power to maintain and accelerate the speed of said device and means for braking the latter, a support, an arm pivotally carried by said support and a track member fixed thereto, a foot engaging element pivoted to said arm and supported by said track for translatory movement, means connected to said arm and operable by translation of the foot member for transmitting motion to said brake, and means operable by pivotal movement of the foot member for transmitting motion to the power feed, the latter transmission including an element which is automatically disengaged when the foot member is translated.

2. In combination with a moving device having means for feeding power to maintain and accelerate the speed of said device and means for braking the latter, a support, an arm pivotally carried by said support and a track member fixed thereto, a foot engaging element pivoted to said arm and supported by said track for translatory movement, means connected to said arm and operable by translation of the foot member for transmitting motion to said brake, and means operable by pivotal movement of the foot member for transmitting motion to the power feed, the latter transmission including a lever pivotally carried by said support and a part carried by said foot member normally engaging said lever but automatically disengaged from the latter when the foot member is translated.

3. The combination with a vehicle having means for feeding power to maintain and accelerate the speed of said vehicle and means for braking the latter, of a foot engageable member, means fixed to the vehicle body and supporting said foot member for translatory movement, means for transmitting translatory motion from said foot member to the brake actuating mechanism, and means for transmitting rocking movement of the foot member to the power feed mechanism wherein the foot member is carried by the fixed support to permit sliding horizontal translation of the foot member thereon and wherein the surface of said support is provided with means for resisting such translation, which resistance means may be overcome by application of a horizontal force when it is desired to actuate the brake.

4. The combination with a vehicle having means for feeding power to maintain and accelerate the speed of said vehicle and means for braking the latter, of a foot engageable member, means fixed to the vehicle body and supporting said foot member for translatory movement, means for transmitting translatory motion from said foot member to the brake actuating mechanism, and means for transmitting rocking movement of the foot member to the power feed mechanism wherein the foot member is carried by the fixed support to permit sliding horizontal translation of the foot member and wherein the surface of said support is provided with an obstruction normally resisting translation of the foot member, which obstruction may be overcome to permit such translation when it is desired to actuate the brake.

5. The combination with a vehicle having means for feeding power to maintain and accelerate the speed of said vehicle and means for braking the latter, of a foot engageable member having a normally fixed position, means fixed to the vehicle body and supporting said foot engageable member for translatory movement forwardly of said position for braking action, means for transmitting translatory motion from said foot member to the brake actuating mechanism, said foot member being pivoted for downward rocking movement of the toe portion thereof about said normally fixed position for actuating the power feed, and means for transmitting said rocking movement of the foot member to the power feed mechanism, wherein the power feed transmission includes a depressable element and an element carried adjacent the toe portion of the foot member and engageable with said depressable element upon downward rocking of said foot member and disengageable from said depressable element when said foot member is translated.

CLINTON D. PALMER.
WILLIAM N. LOWE.